Sept. 28, 1965 R. A. ROM ETAL 3,208,340
SLIDE PROJECTOR APPARATUS WITH AUDIO MECHANISMS
Filed Nov. 2, 1962 7 Sheets-Sheet 1

INVENTOR.
RUDOLPH A. ROM
WILLIAM E. SOONG
BY
Ooms, McDougall & Hersh.
ATTYS.

INVENTOR.
RUDOLPH A. ROM
WILLIAM E. SOONG
BY
ATTYS.

INVENTOR.
RUDOLPH A. ROM
WILLIAM E. SOONG
BY
ATTYS.

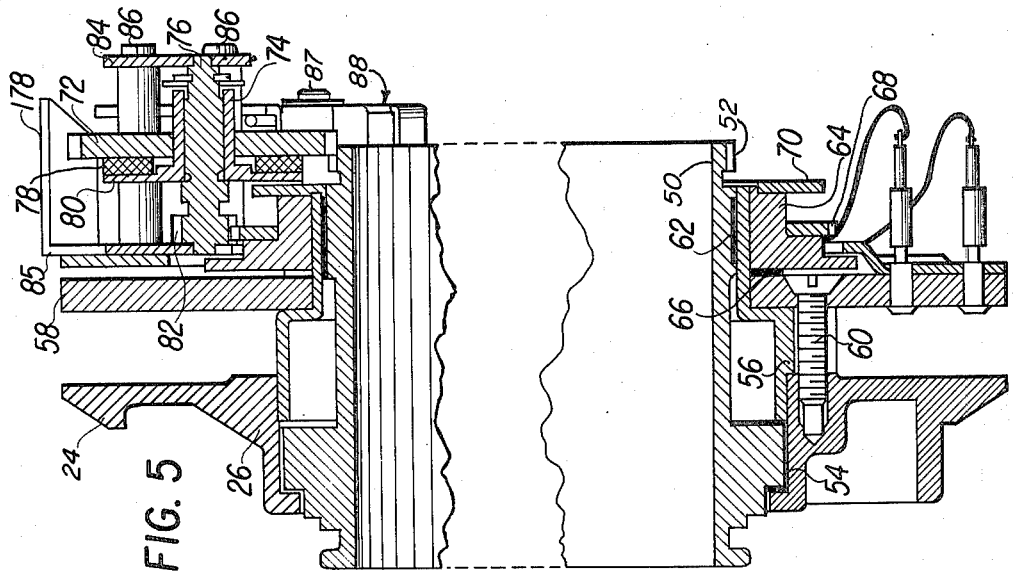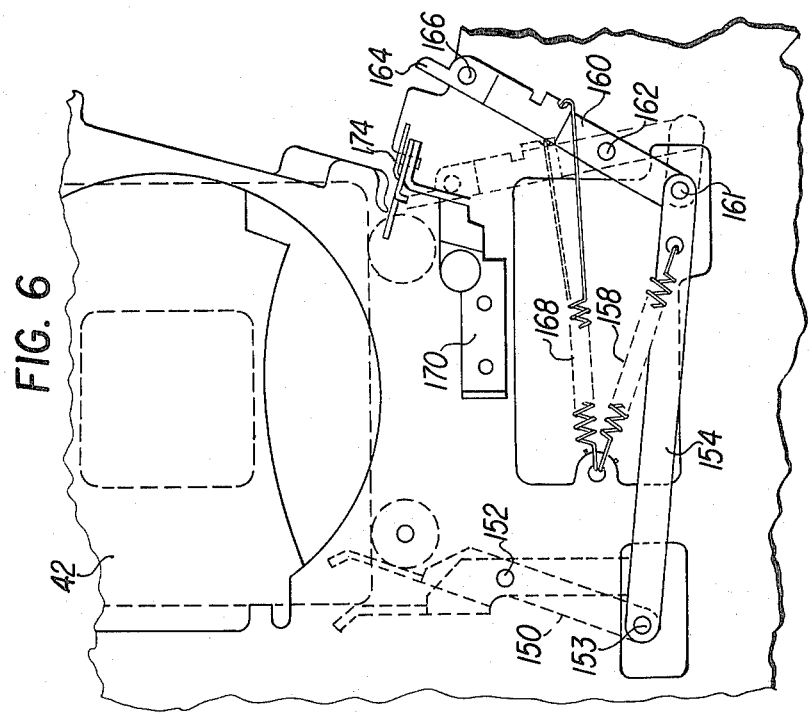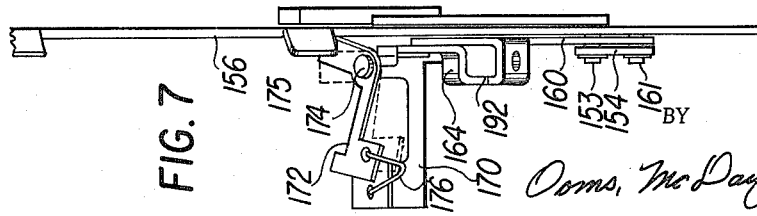

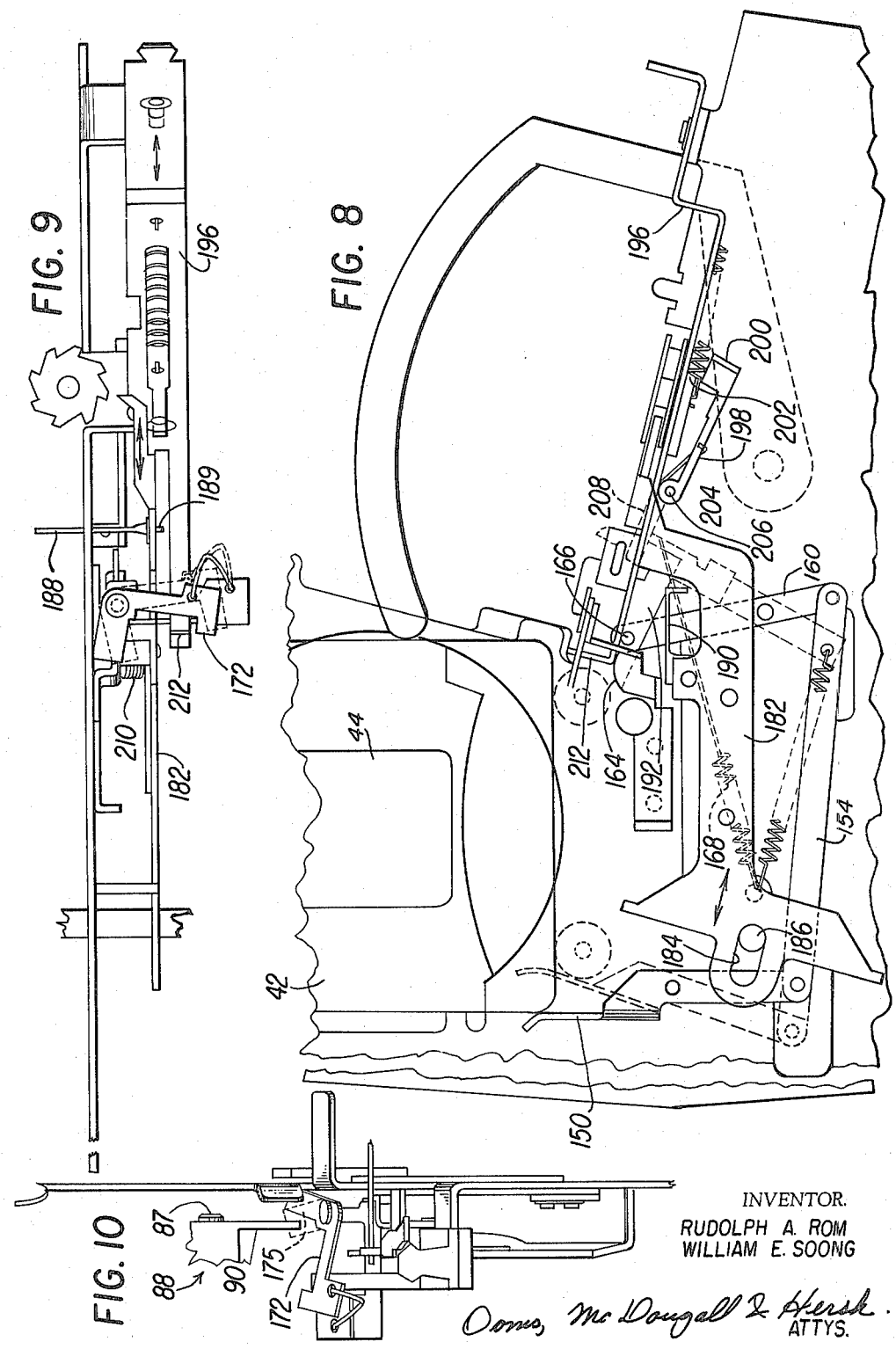

INVENTOR.
RUDOLPH A. ROM
WILLIAM E. SOONG
BY
ATTYS.

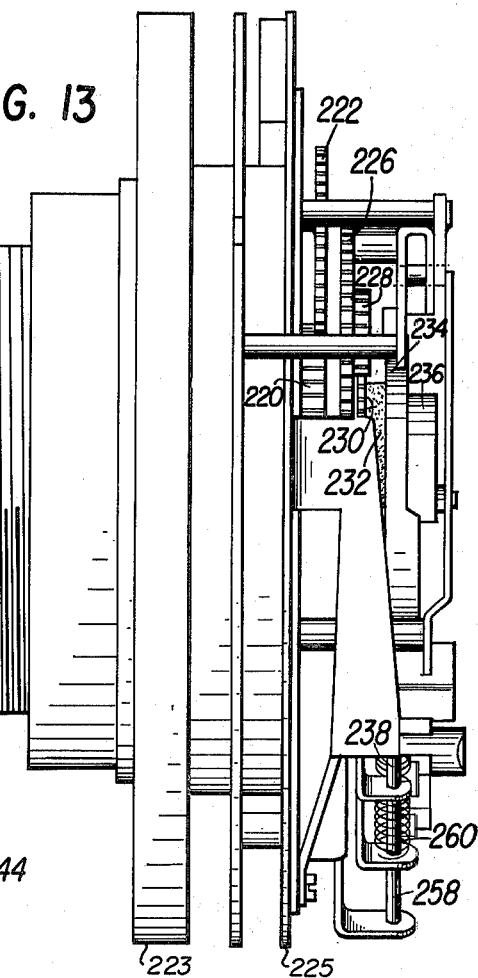
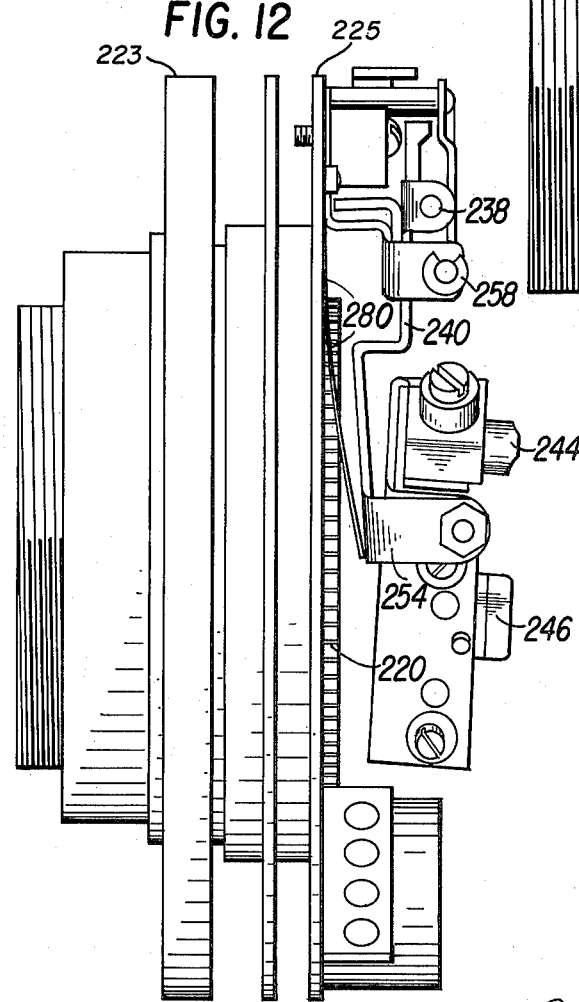
FIG. 13
FIG. 12
INVENTOR.
RUDOLPH A. ROM
WILLIAM E. SOONG

United States Patent Office 3,208,340
Patented Sept. 28, 1965

3,208,340
SLIDE PROJECTOR APPARATUS WITH AUDIO MECHANISMS
Rudolph A. Rom, Berwyn, and William E. Soong, Chicago, Ill., assignors, by mesne assignments, to Minnesota Mining and Manufacturing Company, St. Paul, Minn., a corporation of Delaware
Filed Nov. 2, 1962, Ser. No. 234,977
13 Claims. (Cl. 88—28)

This invention relates to a slide projector apparatus which is provided with mechanisms adapted to incorporate sound along with visual projection. Specifically, the present invention is directed to an apparatus for use in combination with slide assemblies which include a sound track whereby a recording can be made for individual slides, and the recording can be played during visual presentation of the slide.

In the use of conventional slide projectors, transparencies are projected onto a screen and magnified many times. A technique of this type permits the detailed inspection of various subjects for indefinite periods of time. The use of slide projectors has been found to be particularly suitable for accompaniment by speech or other sounds which bear a relation to the picture. Thus, it is well-known that slide projectors are extensively used for educational purposes and for technical lectures. In addition, the projectors are widely used by private individuals since a great deal of time can be taken to explain the details and circumstances relating to a particular picture.

Existing slide projector techniques suffer from certain disadvantages when it is desired to accompany the projection with sound. Thus, in most instances, it is necessary to provide a speaker who must be present during the projecting operation. In other instances, an independent sound track has been provided; however, in this case, the slides must be coordinated with the sound track; and, therefore, they must be shown in perfect order and in a carefully timed sequence.

The disadvantages of the above situations are clear since it may be impossible or inconvenient to provide for the presence of a speaker familiar with the material to be projected. In many cases, the circumstances and details relating to a particular subject may be forgotten after a certain lapse of time. Even where a sound track is employed and coordinated with the slide projection, the need for presenting the slides in a specific order and within a specific period of time clearly detracts from the otherwise advantageous use of slide projection.

In the copending application, Serial No. 151,936, filed November 13, 1961, and entitled "Slide Projector Improvements," there were described a unique projector system and a novel slide assembly which permitted the making and presentation of a recording at the same time that the projecting operation was taking place. The present invention provides an apparatus for carrying out essentially the same function while at the same time utilizing an extremely efficient and practical operating system.

It is one object of the present invention to provide an apparatus which is particularly suitable for use in combination with slide holders having sound tracks disposed thereon whereby simultaneous audio and visual presentation of material can be accomplished.

It is a more particular object of this invention to provide a slide projector apparatus which is adapted to overcome the disadvantages inherent in prior art systems since a recoring for an individual slide can be made in accordance with this invention whereby the need for the presence of a speaker is eliminated, and whereby the slides can be projected in any desired sequence and for any desired time interval.

It is an additional object of this invention to provide an operating mechanism for slide projectors of the type described which is extremely compact, which is characterized by reliable and relatively maintenance-free operation and which is capable of high quality sound reproduction in addition to high quality visual projecton.

These and other objects of this invention will appear hereinafter and for purposes of illustration but not of limitation specific embodiments of this invention are shown in the accompanying drawings in which:

FIGURE 5 is a cross-sectional view taken about the line 5—5 of FIGURE 3;

FIGURE 6 is a schematic illustration of the actuating mechanism for initiating automatic operation of the audio assembly;

FIGURE 7 is a side elevation of the mechanism shown in FIGURE 6;

FIGURE 8 is a schematic illustration of the actuating mechanism which also illustrates the manual actuating elements thereof;

FIGURE 9 is a top view of the mechanism shown in FIGURE 8;

FIGURE 10 is a side elevation of the mechanism shown in FIGURE 8;

FIGURE 12 is a side elevation of the audio assembly taken about the line 12—12 of FIGURE 11; and FIGURE 13 is an additional side elevation of the audio assembly taken about the line 13—13 of FIGURE 11.

Figure 1:
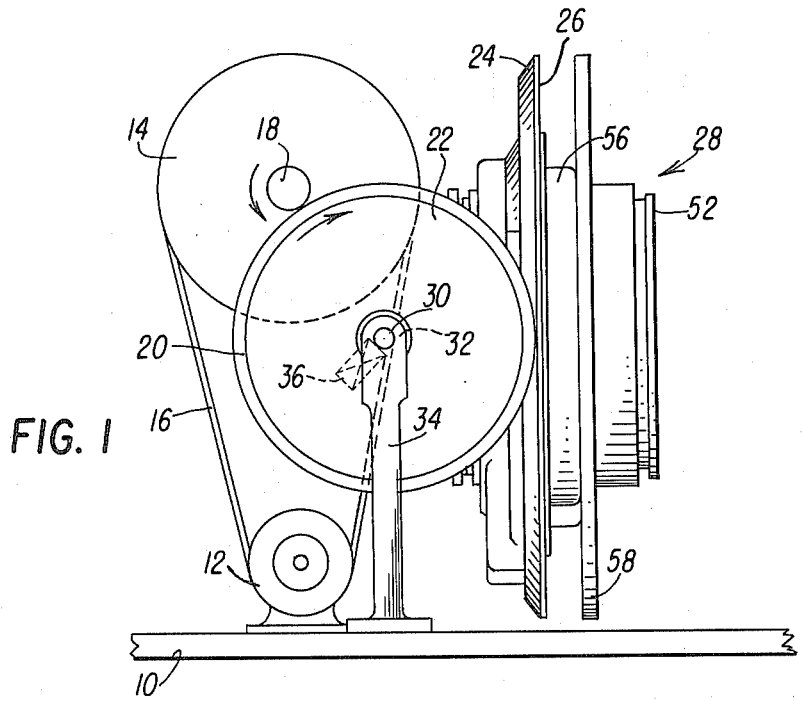
FIGURE 1 is an elevational view illustrating schematically a portion of the audio drive assembly and the described mechanism therefor.

The slide projector apparatus of this invention generally comprises a frame adapted to position a slide transparency and a slide holder carrying the transparency and having a sound track on one face. Means are provided in the apparatus for bringing an audio head into contact with this sound track to provide for recording and playback operations while a visual projection is taking place.

In accordance with this invention, a stationary tubular member is provided in the apparatus. The slide holder is positioned co-axially with this member and a light source projects light through the transparency, through the tubular member and then to a screen for projection.

A drive assembly is disposed around the tubular member and means are provided for rotating the drive assembly. The audio head means are located on the drive assembly, and they are adapted to be moved into engagement with the sound track on the slide holder when the holder is in position. The audio head means are retracted during loading and unloading of the projector and this operation can be carried out either automatically or manually.

The audio head means, which preferably comprises an erasing head as well as a recording and playback head, is operated in a manner such that a spiral path is traversed around the sound track. This is accomplished with the use of a cam arrangement which effects movement of the head means laterally from the inside of the sound track to the outside thereof while the head means are rotating around the track.

In order to effect the desired spiral path in the movement of the audio head means, the drive assembly provides for relative movement of a spiral cam with respect to the rotating audio heads. A cam follower associated with these heads rides on the cam surface from the beginning to the end of the recording cycle. The cam is also provided with a raised portion which is engaged by the cam follower near the end of the audio operation. This provides for withdrawal of the heads away from the sound track whereby the slide holder can be moved in and out of the projector. A latch means is also associated with the cam mechanism so that relative movement of the cam and audio heads will not take place except during recording or playback.

The slide projector of this invention is adapted to operate automatically in combination with projectors which include magazines for indexing a plurality of slide holders and for moving the slide holders one at a time into viewing position. In accordance with this invention, means are provided for unlatching the cam mechanism and for initiating an audio operation when a slide holder has been moved into position within the projector.

A further distinctive feature of the projector of this invention resides in the capability of the projector to be switched to manual operation at any time. To provide this feature, means are included which render inoperative the automatic mechanism above described. At the same time, means are provided for manually initiating the audio portion of the cycle when a slide is in position for recording. This manual operation, however, cannot take place until a slide is in position; and, accordingly, the danger of damaging the mechanisms during manual operation is substantially decreased.

In the accompanying drawings, FIGURE 1 provides a schematic illustration of drive means of the type which may be employed in conjunction with the apparatus of this invention. These drive means are mounted on the projector frame 10, and they include a motor 12 adapted to drive a pulley 14 through operation of the pulley belt 16. A drive member 18 is positioned with respect to the pulley 14 and is operatively connected thereto. This drive member, which may be serrated or otherwise roughened, frictionally engages the rubber rim 20 of an idler wheel 22. This wheel engages the rim 24 of disc member 26 and thereby provides for rotation of drive assembly 28. The rim 24 of the disc 26 and also the rubber rim 20 of the idler wheel 22 may be tapered to provide good mating contact. This arrangement is desirable due to the right angle relationship of the axes of the disc 24 and the idler wheel 22.

The idler wheel 22 rotates on a shaft 30 which is disposed in the slot 32 formed in the upright post 34. A light spring 36 is provided to urge the rim 20 into engagement with the drive member 18 and the rim 24. By providing a spring-loaded idler wheel of this nature, a more constant power transmission is effected, and the danger of variations due to wear and atmospheric conditions is largely obviated. Furthermore, the constant pressure engagement of the various moving parts and the use of a rubber idler member provides for extremely smooth, vibration free rotation of the drive assembly 28.

Figure 2:
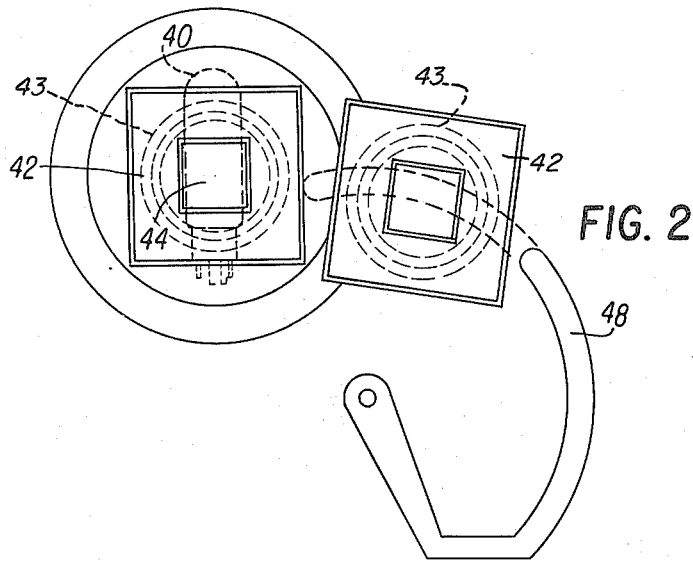
FIGURE 2 is an elevational view illustrating schematically the relationship of the slide holding and positioning mechanism to the projector.

FIGURE 2 is an additional schematic view illustrating a light source 40 positioned behind a slide holder 42 carrying a sound track 43 whereby images on the transparency 44 can be projected onto a screen. A plurality of slide holders 42 are adapted to be aligned in a conventional magazine for automatic loading into the projector by means of the arm 48. A similar arm moving from the opposite direction can be provided for ejecting a slide assembly after the audio and visual operations are completed. The magazine may be of the type which will index one position whereby the succeeding slide can be automatically positioned for viewing.

Figure 3:
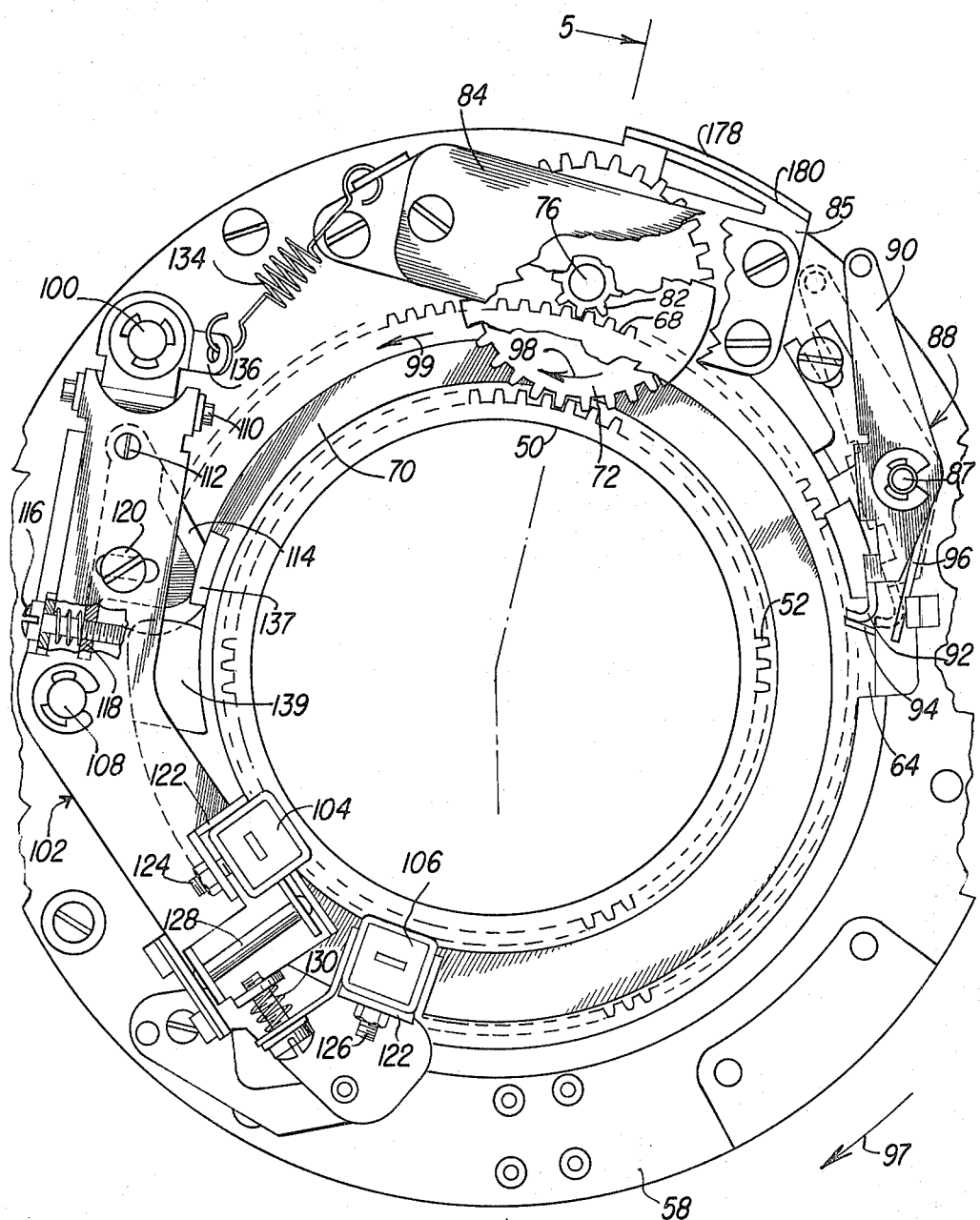
FIGURE 3 is an enlarged front elevation of the audio assembly for the slide projector.
Figure 4:
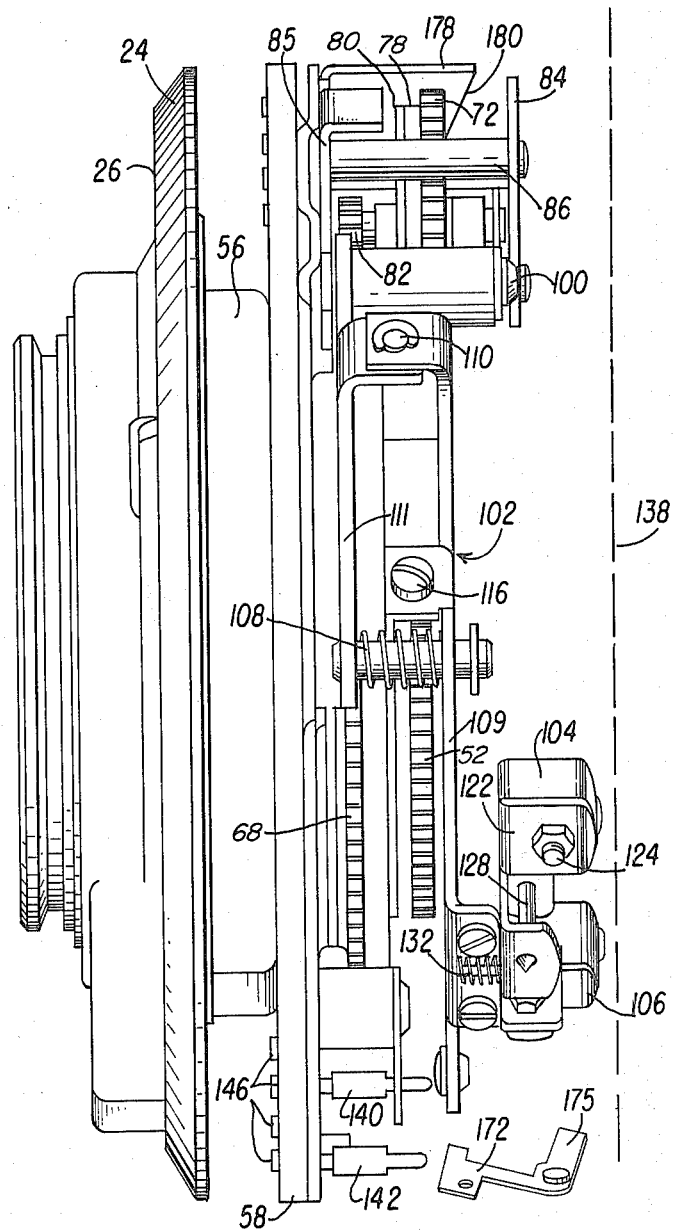
FIGURE 4 is a side elevation of the audio assembly shown in FIGURE 3, looking from the left-hand side of FIGURE 3.

A detailed illustration of one form of a drive assembly and associated audio assembly of this invention is shown in FIGURES 3, 4 and 5. These figures illustrate a stationary tubular member 50 which includes a sun gear 52 formed at one end thereof. The disc 26 previously referred to is adapted to rotate about the stationary tube over the bearing 54. An internal tubular element 56 is secured between the disc 26 and a printed circuit plate 58 by means of a bolt 60. This element 56 rides on the bearing surface 62 provided in the outer face of the stationary member 50.

A latch disc 64 is located around the element 56 and is separated from the plate 58 by means of the bearing 66. Mounted on the latch disc are a cam gear 68 and a cam 70.

Operatively associated with the sun gear 52 is a gear 72 which is fitted around the sleeve 74. The sleeve 74 is fastened to shaft 76 and a slip clutch 78 is interposed between the gear 72 and the flange 80 formed in one end of the sleeve 74. A gear 82 is formed in the end of the shaft 76 and this gear is operatively associated with the cam gear 68.

A sheet member 84 is secured to the stamping 85 by means of posts 86 and this sheet member and the stamping provide a journal for the ends of the shaft 76.

Pivotally mounted on the plate 58 at 87 is a latch means 88. This latch means includes a cam arm 90 and a latch end 92. The latch end engages a shoulder 94 which is formed in the latch disc 64. Torsion spring 96 normally holds the arm 90 in the outward position shown, and, accordingly, urges the end 92 into engagement with the shoulder 94 to restrain movement of the disc 64 relative to the plate 58.

It will be apparent that with the plate 58 rotating about the stationary sun gear 52, the slip gear 72 will also be rotated about the shaft 76. When the latch is engaged with the disc 64, the slip gear will move relative to the sleeve 74, and, therefore, the gear 82 at the end of shaft 76 will not rotated about its axis. However, when the latch end 92 is moved to the dotted line position shown in FIGURE 3, the latch disc 64 will be capable of relative movement with respect to the plate 58. This relative movement is accomplished due to the operation of slip clutch 78 which causes rotation of sleeve 74 and, accordingly, shaft 76, along with rotation of slip gear 72. The gear 82 will then rotate and move the cam gear 68 as well as the latch disc 64 and cam 70 relative to the plate 58. The latch end 94 will ride on the outer edge of the latch disc 64 until one complete revolution of relative movement is realized. The latch end 92 will then again engage the shoulder 94 to lock the system against further relative movement.

With the plate 58 rotating in the direction of the arrow 97, the slip gear 72 will rotate in the direction of the arrow 98. Therefore, the relative movement between the latch disc 64 and the plate 58 will be in the direction of the arrow 99. However, due to the gear reduction effected by the system shown, the latch disc 64 actually will move in the same direction, although at a slower angular velocity relative to the stationary sun gear 52, as the plate 58.

Pivotally mounted at 100 on the plate 58 is an audio head arm 102. This arm includes an erase head 104 and a recording and playback head 106. A compression spring 108 is interposed between the upper section 109 and lower section 111 of the arm 102 and this compression spring urges these sections apart and aids in the pressing of the heads into engagement with the sound track as will hereinafter appear.

The upper section 109 is adapted to pivot away from the lower section 111 about a pin 110. The relative position of the arm with respect to plate 58 is controlled by cam follower 114 which is fastened to the arm at 112. This cam follower is provided with a fine adjustment screw 116 which is threaded into an extension 118 on the follower. A screw 120 provides for securement of the follower after adjustment.

The audio heads 104 and 106 are mounted on bracket arms 122 by means of screws 124 and 126. The bracket for holding the heads is adapted to oscillate about the pin 128 while spring 130 is used to adjust azimuth and spring 132 stabilizes the head bracket parallel to arm 102 when the arm is retracted.

A spring 134 is connected to an extension 136 of the audio head arm 102 near the pivot 100. This spring normally urges the arm and the associated heads towards the center of the mechanism, and it therefore provides for pressing of the cam follower into engagement with the cam 70.

The cam 70 is provided with portions 137 and 139 which extend inwardly toward the plate 58. During rotary movement of the plate 58 and before a slide holder is in position, the cam follower 114 rests on the inwardly extending portion 137 of the cam as shown in FIGURE 3. As soon as the latch end 92 is released from engagement with the latch disc 64, and when the aforementioned relative movement commences, the cam follower will move past this raised portion and begin its travel along the edge of the cam 70. It will be appreciated that as soon as the cam follower moves off the raised portion, the heads 104 and 106 will be moved away from the plate 58 by the spring 108. Furthermore, since the cam 70 becomes progressively wider, the heads 104 and 106 will move in a spiral path which carries them laterally outwardly in opposition to the spring 134. When a sound track is provided in the plane of the line 138 shown in FIGURE 4, the heads will move outwardly into engagement with this sound track and will traverse it along a spiral path. When the follower nears the end of the cam track, it will ride up the raised portion 139 to thereby retract the heads. Latching of the disc 64 then takes place.

Electrical pickup for the heads can be achieved through terminals 140 and 142 mounted on the plate 58. In one form of this invention, slip contacts can be provided for engaging conductive rings 144 and 146 formed in the face of the plate 58. Appropriate leads can obviously be provided for transmitting electrical power to the moving head assembly.

As previously indicated, the mechanisms of this invention can be operated automatically in response positioning of a slide holder for viewing purposes. FIGURES 6 and 7 illustrate the means employed for automatically initiating the audio portion of the apparatus after slide holder 42 has been positioned for viewing.

In the structure shown, there is provided a trigger arm 150 which extends into the path of the slide holders as they are moved into position. The trigger arm is pivoted at 152 and is connected at 153 to a link 154. The link 154 is connected to the frame member 156 by means of tension spring 158 whereby the trigger arm 150 is normally urged into the area for positioning the slide holder.

A lever 160 is fastened to the link at 161 and is pivotally connected to the frame at 162. A pawl 164 is pivotally connected to the lever at 166, and spring 168 normally urges this lever into alignment with the pawl axis.

Also mounted on the projector frame is a bracket 170 which carries a tripper 172 pivotally connected thereto at 174. The tripper is adapted to assume two positions which are controlled by over-center spring 176.

When a slide holder 42 is inserted into position, the slide engages the trigger arm 150 and moves this arm to the position shown in dotted lines in FIGURE 6. The arm in turn causes movement of the link 154, lever 160 and pawl 164 to the dotted line positions shown. When the pawl 164 is moved to the dotted line position, the pawl engages the tripper 172 and swings this tripper to the dotted line position shown. This movement results in the placement of the actuating end 175 of the tripper into position for unlatching of the latch disc in the drive assembly above described. The pawl 164 continues to move past the tripper whereby this pawl will not interfere with resetting of the tripper.

FIGURE 4 illustrates the tripper 172 and its relative position with respect to the drive assembly. As will be apparent when considering FIGURE 3, the cam arm 90 of the latch 88 will be rotated into the area of the tripper as the drive assembly revolves. The relative positions of the parts described are maintained so that the arm 90 will cam over the portion 175 of the tripper when it is in the unlatching position and this will result in unlatching of disc 64.

Immediately behind the latch means 88 on the drive assembly, there is provided tripper reset 178. This reset includes a tapered edge 180 which also will move against the side of tripper portion 175 when this portion is in the unlatching position. This force of the reset member when engaging the tripper will move the tripper to the reset position shown in solid lines in FIGURES 6 and 7.

It will be apparent that with the above arrangement, the latch end 92 will re-engage the latch disc 64 after one complete cycle, since the tripper member will be moved out of position so as not to interfere with the latching operation of the member 88. It will also be apparent that the next audio cycle will not be initiated until the slide holder is removed and a new slide inserted to initiate the same operation. In this connection it will be noted that the pawl 164 is adapted to pivot and slide under the tripper during its return upon removal of a slide holder. Where an automatic indexing means for the slide holders is provided, it will be obvious that each audio cycle will be accomplished automatically as each slide is placed in position for viewing.

FIGURES 8 through 10 illustrate the same structure as shown in FIGURES 6 and 7 with the addition of those elements which are provided for manual operation of the apparatus. These elements include the member 182 which is provided with a slot 184 whereby it can be reciprocally moved over pin 186. The member 182 is adapted to be moved by a wire form 188 secured thereto at 189. A setup arm 190 is attached to the member 182, and this arm is adapted to be moved into the path of movement of outwardly extending portion 192 formed in the pawl 164. Thus, when the member 182 is moved to the position shown in FIGURE 8, the setup arm 190 interferes with the movement of the pawl 164 when a slide holder 42 pushes against trigger arm 150. This interference with the pawl 164 results in pivoting of the lever in opposition to the spring 168.

A manual slide 196 is also included in the illustrated structure. Slide latch 198 having latch end 200 is adapted to engage shoulder 202 formed in the manual slide. Spring 204 normally urges the latch end 200 into engagement with the shoulder. The slide latch 198 is pivotally mounted at 206 and latch release arm 208 extends on the opposite side of this pivot.

When it is desired to manually operate the apparatus, a switch or other means can be actuated which will operate the wire form 188 whereby the member 182 will be moved outwardly in opposition to the spring 210. This moves the setup arm 190 into the path of the extending portion 192 of the pawl 164. Therefore, when the pawl 164 is moved in response to insertion of a slide holder, the pawl will pivot about the point 166 and will clear the tripper 172. Accordingly, insertion of a slide holder will not operate automatically to effect commencing of an audio cycle.

It will be noted, however, that pivoting of the pawl 164 results in engagement of the lower end thereof with the release arm 208 of slide latch 198. Accordingly, as long as the pawl 164 is in this position, the manual slide 196 will be in the released condition. This manual slide is provided with an upturned end 212 which extends behind the tripper 172. This upturned end is effective to move the tripper when the slide 196 is moved to the right as shown in the drawings. Accordingly, manual movement of the tripper can be accomplished at any time after the pawl 164 effects release of the slide 196.

It is important to note in connection with both the automatically and manually actuated mechanisms that initiation of an audio cycle can not be accomplished until a slide holder is in position. Thus, in the case of automatic operation, the tripper 172 cannot be set until it is engaged by the pawl 164, and this pawl cannot set the tripper until a slide holder is in position. In the case of manual operation, the tripper cannot be set by the manual slide 196 until the pawl 164 releases the slide latch 198. Again, it is necessary to move a slide holder into position in order to effect operation of the pawl 164.

Figure 11:
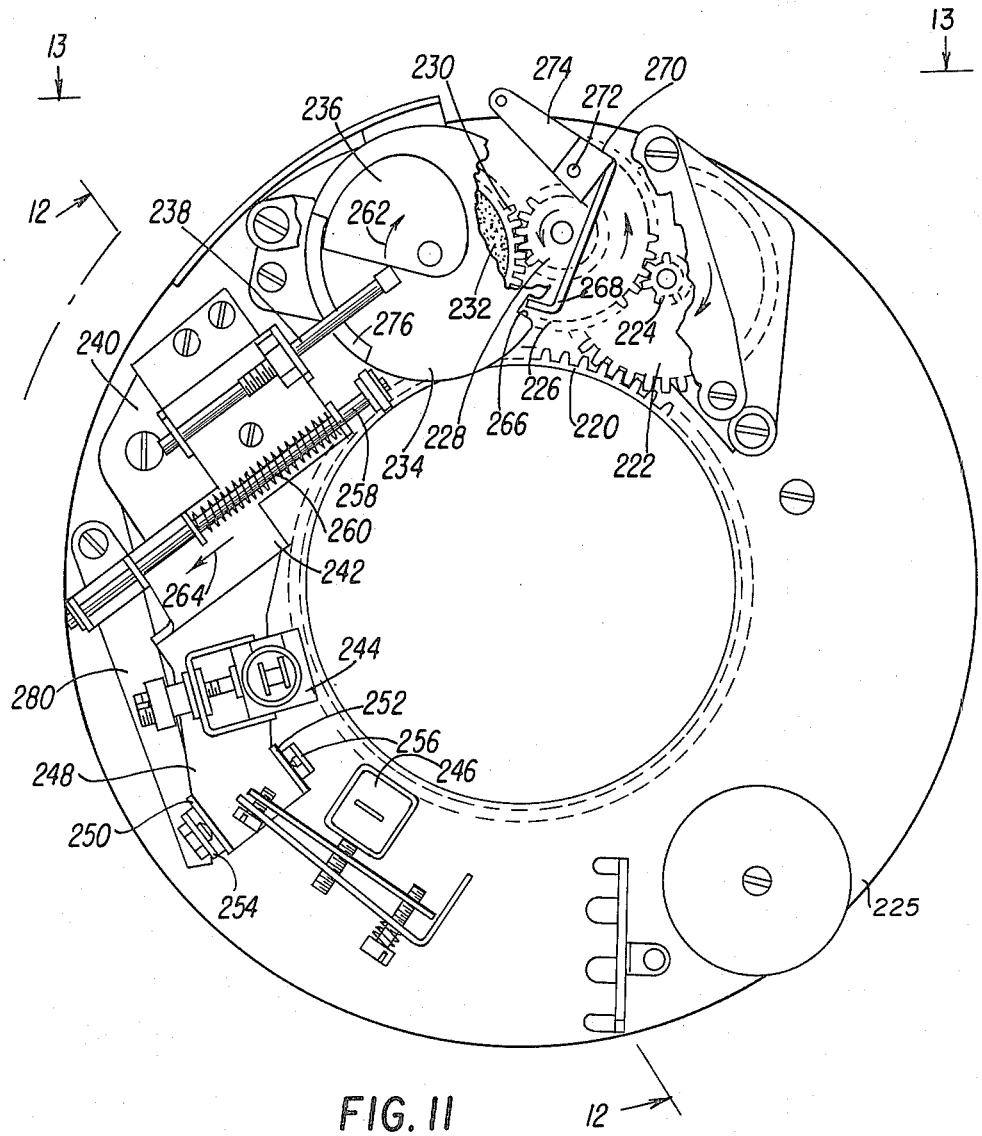
FIGURE 11 is an elevational view of an alternative audio assembly for use in accordance with the concepts of this invention.

FIGURES 11 through 13 illustrate a modified form of the invention. In this apparatus, there is also provided a stationary sun gear 220 which engages a gear 222. As in the above described form, rotary movement of a drive assembly around the sun gear is achieved by imparting driving movement to a disc, here shown at 223. The drive assembly is mounted on a plate 225 which rotates with the disc 223. The small gear 224 operatively connected to the gear 222 drives a similar gear arrangement 226 and 228. The gear 228 drives slip gear 230 which is in contact with slip clutch 232. The slip clutch is interposed between the slip gear and a cam disc 234.

The cam disc 234 is provided with a cam track 236 in its upper face. The rod 238 comprises a cam follower which is operatively connected to the head bracket 240. The elongate arm 242 of this bracket is provided for mounting erase head 244 and record and playback head 246. These heads are pivotally mounted on stamping 248 which is provided with upstanding arms 250 and 252. These arms engage corresponding arms 254 and 256 formed in the elongate arm 242. The entire bracket assembly 240 is adapted to reciprocate with respect to the rod 258. The spring 260 positioned around this rod normally urges the cam follower 238 into engagement with the cam 236. It will, therefore, be appreciated that rotation of the cam 236 in the direction of the arrow 262 will provide for gradual movement of the bracket 240 in the direction of the arrow 264 along the rod 258. In this manner, the heads 244 and 246 are caused to move in a spiral path as they rotate around a sound track.

The cam plate 234 is provided with a recess 266 in its periphery. This recess is adapted to be engaged by latch end 268 of the latch 270. The latch 270 is pivotally mounted at 272 and includes arm 274 which is adapted to be engaged by a tripper to release the cam plate 234. It will be apparent that as long as the latch end 268 is engaged with the recess 266, the slip gear 230 will not provide for rotation of the cam plate 234. However, when the latch end is released, the cam plate will rotate and the latch end will ride on the edge of this plate until it again falls into the recess 266.

As in the case of the apparatus previously described, it is necessary to provide means for withdrawing the heads away from the sound track when a recording cycle is completed and during changing of the slide holders. This operation is accomplished by the provision of the raised portion 276 formed in the face of the cam plate 234. When the cam follower 238 engages this raised portion, bracket 240 is caused to pivot about the rod 258. This action then results in movement of the heads toward the mounting plate for the slide holders and away from the sound track. Leaf springs 280 are provided for normally urging the heads toward the sound track, and, accordingly, pivoting of the bracket 240 is accomplished in opposition to the leaf springs.

It will be appreciated that the embodiments of this invention above described provide for an extremely practical and reliable means for incorporating audio cycles into slide projector operations. It will be understood that various modifications can be made in any of the several components which make up the embodiments of the invention without departing from the spirit of the invention particularly as defined in the following claims.

That which is claimed is:

1. In a slide projector of the type adapted to hold a slide transparency mounted in a slide holder with the slide holder carrying a circular sound track on one face thereof surrounding said transparency, means for positioning said holder within said projector, means for recording and playing back material on the sound track comprising a stationary tubular member providing a sun gear formed therearound, said tubular member being positioned in axial alignment with the projection light source and the transparency, a drive assembly mounted coaxially with said tubular member and rotatably disposed around said sun gear, means for rotating said drive assembly, cam means on said drive assembly and rotatable therewith, an audio head, an arm mounting said audio head on said drive assembly and providing a cam follower, whereby said audio head is moved into engagement with said sound track and moved radially with respect to the tubular member as it rotates around said sound track.

2. A slide projector in accordance with claim 1 wherein said drive means includes a gear reduction system, said system including a first gear associated with said sun gear and a second gear associated with said cam, clutch means included in said system and latch means for restraining relative movement of said cam relative to said drive assembly.

3. A slide projector in accordance with claim 2 including a plate for mounting said cam, a cam gear also mounted on said plate, and a shoulder formed in said plate adapted to be engaged by said latch means whereby said plate rotates in unison with said drive assembly when said latch is engaged.

4. A slide projector in accordance with claim 2 wherein said latch means comprises a pivotal member having a cam projection thereon, a tripper adapted to be moved into position to engage said projection and to thereby unlatch said latch means, said tripper being adapted to operate in response to positioning of said slide assembly in said projector.

5. A slide projector in accordance with claim 2 including releasing means associated with the positioning means for said slide assembly, said releasing means being adapted to automatically release said latch means upon insertion of said slide assembly into said positioning means.

6. A slide projector in accordance with claim 5 including means for rendering said releasing means inoperative, and further including a manual releasing means for releasing said latch when said first mentioned releasing means is inoperative.

7. A slide projector in accordance with claim 2 wherein said latch means comprises a pivotal member having a cam projection thereon, a tripper adapted to be moved into position to engage said projection and to thereby unlatch said latch means, and slide means accessible from the outside of said projector for manually moving said tripper into an engaging position.

8. A slide projector in accordance with claim 7 including means for locking said manual slide means whereby it is held against moving said tripper, and further including actuating means operating in response to insertion of said slide assembly into said positioning means, said actuating means automtically moving said tripper into said engaging postion when said locking means holds said manual slide.

9. In a slide projector of the type adapted to hold a slide transparency mounted in a slide holder with the slide holder carrying a circular sound track on one face thereof surrounding said transparency, and means for positioning said holder within said projector, the improvement comprising means for recording and playing back material on the sound track, including a stationary tubular member, said tubular member being positioned in axial alignment with the projection light source and the transparency, a drive assembly mounted coaxially with said tubular member and rotatably disposed therearound, means for rotating said drive assembly, cam means on said drive assembly and rotatable therewith, an audio head, an arm mounting said audio head on said drive assembly and providing a cam follower, and means integral with said tubular member and coacting with said drive assembly to effect relative movement between said cam follower and said cam means whereby said audio head is moved into engagement with said sound track and moved radially with respect to the tubular member as it rotates around said sound track.

10. A slide projector in accordance with claim 9 wherein said cam means comprises a large annular member concentrically positioned with respect to said tubular member.

11. A slide projector in accordance with claim 9 wherein said cam means comprises a relatively small member compared to said tubular member, said cam means being mounted for rotation at a point outside the periphery of said tubular member.

12. A slide projector in accordance with claim 11 wherein said drive assembly is mounted on an annular member rotatably positioned around said sun gear, and including a gear system between said sun gear and said cam means for rotating said cam means in response to relative rotation between said annular member and said sun gear, a clutch means included between said gear system and said cam means, and latch means for holding said cam means against said rotation.

13. In a slide projector of the type adapted to hold a slide transparency mounted in a slide holder with the slide holder carrying a circular sound track on one face thereof surrounding said transparency, and means for positioning said holder within said projector, the improvement comprising means for recording and playing back material on the sound track, including a stationary member defining a central opening, said stationary member being positioned in axial alignment with the projection light source and the transparency, a drive assembly mounted coaxially with said stationary member and rotatably disposed therearound, means for rotating said drive assembly, means on said drive assembly defining a spiral track and rotatable therewith, an audio head, an arm mounting said audio head on said drive assembly and providing a follower for engagement with said track, and means integral with said stationary member and coacting with said drive assembly to effect relative movement between said follower and said spiral track, whereby said audio head is moved into engagement with said sound track and moved radially with respect to the tubular member as it rotates around said sound track.

References Cited by the Examiner
UNITED STATES PATENTS

| | | | |
|---|---|---|---|
| 2,925,753 | 2/60 | Schwartz et al. | 88—28 |
| 2,961,922 | 11/60 | Schwartz et al. | 88—28 |
| 3,122,054 | 2/64 | Dimitracopuolos et al. | 88—28 |

JULIA E. COINER, *Primary Examiner.*